United States Patent
Uchiyama

[11] Patent Number: 5,880,463
[45] Date of Patent: Mar. 9, 1999

[54] OPTICAL FIBER STRAIN-MEASURING APPARATUS

[75] Inventor: Haruyoshi Uchiyama, Tokyo, Japan

[73] Assignee: Ando Electric Co., Ltd., Tokyo, Japan

[21] Appl. No.: 954,799

[22] Filed: Oct. 21, 1997

[30] Foreign Application Priority Data

Oct. 31, 1996 [JP] Japan .................. 8-290851

[51] Int. Cl.$^6$ .................. G01J 1/04
[52] U.S. Cl. .................. 250/227.14; 73/760
[58] Field of Search .................. 250/227.11, 227.14, 250/227.15, 227.16, 227.18, 227.19; 385/12, 13, 28; 73/760, 800

[56] References Cited

U.S. PATENT DOCUMENTS 5,780,844  7/1998  Egalon et al. .................. 250/227.14
5,798,521  8/1998  Froggart .................. 250/277.14

OTHER PUBLICATIONS

O. Ogawa et al., "A Novel Technique for Measuring a time–varying Optical Fiber Strain," Technical Report of the Institute of Electronics Information and Communication Engineers, OPE95–102, pp. 31–36 (1995–11).

M. Kamikatano et al., "A Time–varying Optical Fiber Strain Measurement By Using Brillouin Ring Amplifying System," International Wire and Cable Symposium Proceedings, pp. 689–694 (1996).

Primary Examiner—Edward P. Westin
Assistant Examiner—Kevin Pyo
Attorney, Agent, or Firm—Fish & Richardson P.C.

[57] ABSTRACT

The objective of the present invention is to offer an optical fiber strain-measuring apparatus, which allows the detecting of the amount of strain at an arbitrary distance within a test optical fiber as well as the distance strain distribution, and facilitates the detecting of the back scattered light. In order to achieve the above objective, the present invention comprises an acousto-optic switch 108 which outputs a measuring pulse light, an optical circulator 112 which forwards the measuring pulse light to an optical ring circuit possessing a test optical fiber 124, while allowing the natural Brillouin back scattered light generated from the test optical fiber 124 to travel through the optical ring circuit, a frequency conversion section 132 to successively convert the reference light outputted from an optical directional coupler 102 into a reference pulse train which has its frequency change into a step form, and an acousto-optic switch 134 to output the reference pulse train as a sampling pulse, and the sampling pulse and the natural Brillouin back scattered light outputted from the optical ring circuit are converted into electrical signals by the opto-electric conversion section 138, and the signal processing section 146 measures the strain of the test optical fiber 124 based on these electrical signals.

5 Claims, 4 Drawing Sheets

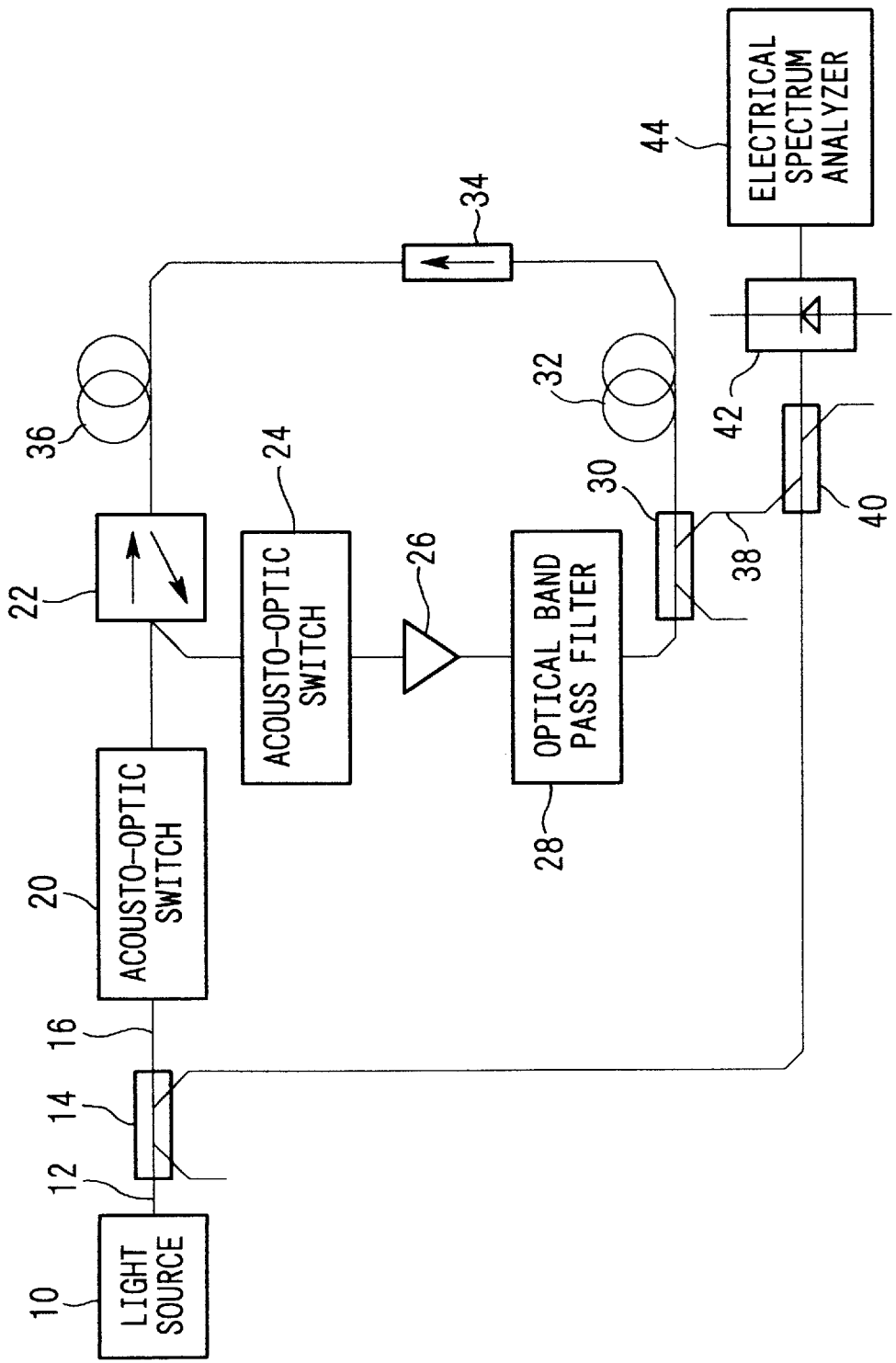

OPTICAL FIBER STRAIN-MEASURING APPARATUS

BACKGROUND OF THE INVENTION

1. Technical Field of the Invention

The present invention relates to an optical fiber strain-measuring apparatus which measures the strain of an optical fiber by way of inputting light pulses into an optical fiber, detecting, and analyzing the generated natural Brillouin scattering of light.

2. Description of the Related Art

An optical fiber strain-measuring apparatus, generally, inputs light pulses into one end of a test optical fiber, removes the back scattered light which is generated within the test optical fiber from the same end as that where the above light pulses are inputted, heterodyne detects with a photo detector the multiplexed light which has multiplexed the extracted back scattered light with a continuous light (reference light) having a fixed wavelength, and from the relationship between the detected signals and the time elapsed since the inputting of the above light pulses, measures the strain position of the test optical fiber.

In recent years, an optical fiber strain-measuring apparatus to measure the strain and the like of a test optical fiber by means of inputting light pulses into a test optical fiber, detecting, and analyzing the natural Brillouin scattered light generated within the test optical fiber has been conceived. An apparatus which employs an Optical Fiber Ring Laser can be given as an example of an apparatus which measures the properties of an optical fiber by means of detecting the natural Brillouin scattered light.

This apparatus measures the strain of a test optical fiber by means of having an optical ring comprising an acousto-optic switch for pulsing the natural Brillouin scattered light outputted from the test optical fiber, inputting into the optical ring the light pulses having a prescribed wavelength, and heterodyne detects the outputted natural Brillouin scattered light which have been pulsed.

The acousto-optic switch is provided for obtaining only the natural Brillouin scattered light generated from a prescribed position within the test optical fiber.

However, conventional apparatuses have a disadvantage where the natural Brillouin scattered light obtained by the acousto-optic switch is limited to only the natural Brillouin scattered light generated at a prescribed position within the test optical fiber.

Additionally, there is a disadvantage, when heterodyne detecting, where the frequency band of the synthesized light which synthesizes the frequency of the natural Brillouin scattered light and the reference light is high, ranging approximately from 10 to 12 GHz, and makes detecting difficult.

Furthermore, since the cycle of the light pulse inputted into the optical ring is set to the amount of time needed for the light pulse to circle the entire length of the optical ring, there is a disadvantage that once the length of the optical ring is set, an extremely burdensome process ensues when the ring length of the optical ring is changed at a later time.

SUMMARY OF THE INVENTION

The present invention has the objective to offer an optical fiber strain-measuring apparatus which allows the detecting of the amount of strain at an arbitrary distance within a test optical fiber as well as the distance strain distribution, facilitates the detecting of the back scattered light, and allows the measuring of the length of the optical ring.

In order to achieve the above objective, the present invention comprises the following:

a light source, which emits continuous light of a reference frequency;

a first optical directional coupling means for branching the continuous light into a measuring light and a reference light, and for outputting the two resulting lights;

a first pulsing means for pulsing the measuring light at a prescribed cycle, and for outputting a measuring pulse light;

an optical ring circuit, comprising a test optical fiber which is the object of the strain measurement, a light circulating means for forwarding the measuring pulse light to the test optical fiber, and for forwarding the back scattered light generated within the test optical fiber, a light amplifying means for amplifying the back scattered light outputted from the light circulating means, an optical noise eliminating means for eliminating from the back scattered light amplified by the light amplifying means, the noise component generated by the light amplifying means, and for allowing only the signal component to pass through, a second optical directional coupling means for outputting after branching into two the back scattered light outputted from the optical noise eliminating means, a delaying means for applying a delay to the first branch of the back scattered light outputted from the second optical directional coupling means, and a light isolating means for outputting to the test optical fiber the back scattered light outputted from the delaying means, and for intercepting the measuring pulse light which have passed through the test optical fiber, and where the pulse outputting cycle of the pulsing means is defined by the length of the circuit;

an optical frequency converting means for outputting a reference pulse train, which periodically converts the optical frequency of the reference light, outputted from the first optical directional coupling means;

a second pulsing means for pulsing the reference pulse train at a prescribed moment, and for outputting a sampling pulse;

a third optical directional coupling means for multiplexing the second branch outputted from the second optical directional coupling means with the sampling pulse, and for outputting the multiplexed light;

a light receiving means for heterodyne receiving and converting into electrical signals the multiplexed light outputted from the third optical directional coupling means; and a signal processing means for measuring the strain of the test optical fiber based on the electrical signals outputted from the light receiving means.

The present invention has the effect of facilitating the detection of the amount of strain at an arbitrary distance within a test optical fiber as well as the distance strain distribution.

Since the frequencies of the back scattered light and the sampling pulse are made to be very close to each other when being received by the light receiving means, there is the added effect of facilitating the detection of the back scattered light.

Furthermore, since the length of the optical ring circuit can be measured, there is no need to change the length of the optical ring circuit, and the cycle of the measuring pulse light can easily be made identical to the length of the optical ring circuit.

In addition, it is desirable for the signal processing means of the present invention to comprise an amplifying means for amplifying the electrical signals, a filter to allow only the signal component from the amplified electrical signals to pass through, an A/D conversion section to convert the electrical signals into digital signals, and a signal processing section to perform necessary processes on the digital signals and to obtain the strain.

In addition, it is desirable for the second pulsing means of the present invention to pulse the reference pulse train at an arbitrary moment of time.

In addition, the second optical directional coupling means of the present invention possesses an inputting end to guide the light signals into the optical ring circuit. And the present invention also comprises a switching means provided in between the first pulsing means and the light circulating means for forwarding to the inputting end of the second optical directional coupling means the measuring pulse light outputted from the first pulsing means. And the signal processing means of the present invention calculates the length of the optical ring circuit from the time difference between the electrical signals outputted from the light receiving means which are based on the measuring pulse light which are outputted from the switching means and, without traveling through the optical ring circuit, are outputted via the second directional coupling means and the third directional coupling means, and the electrical signals outputted from the light receiving means which are based on the measuring pulse light which have traveled through the optical ring circuit and are outputted via the second directional coupling means and the third directional coupling means.

Furthermore, the switching means of the present invention has the function to either forward to the light circulating means or to forward to the inputting end of the second optical directional coupling means the measuring pulse light outputted from the first optical directional coupling means.

BRIEF DESCRIPTION OF THE DRAWINGS

FIG. 4 is a block diagram illustrating the structure of an optical fiber strain-measuring apparatus which is a prior art of the present invention.

DETAILED DESCRIPTION OF THE PREFERRED EMBODIMENTS OF THE INVENTION

Figure 1:
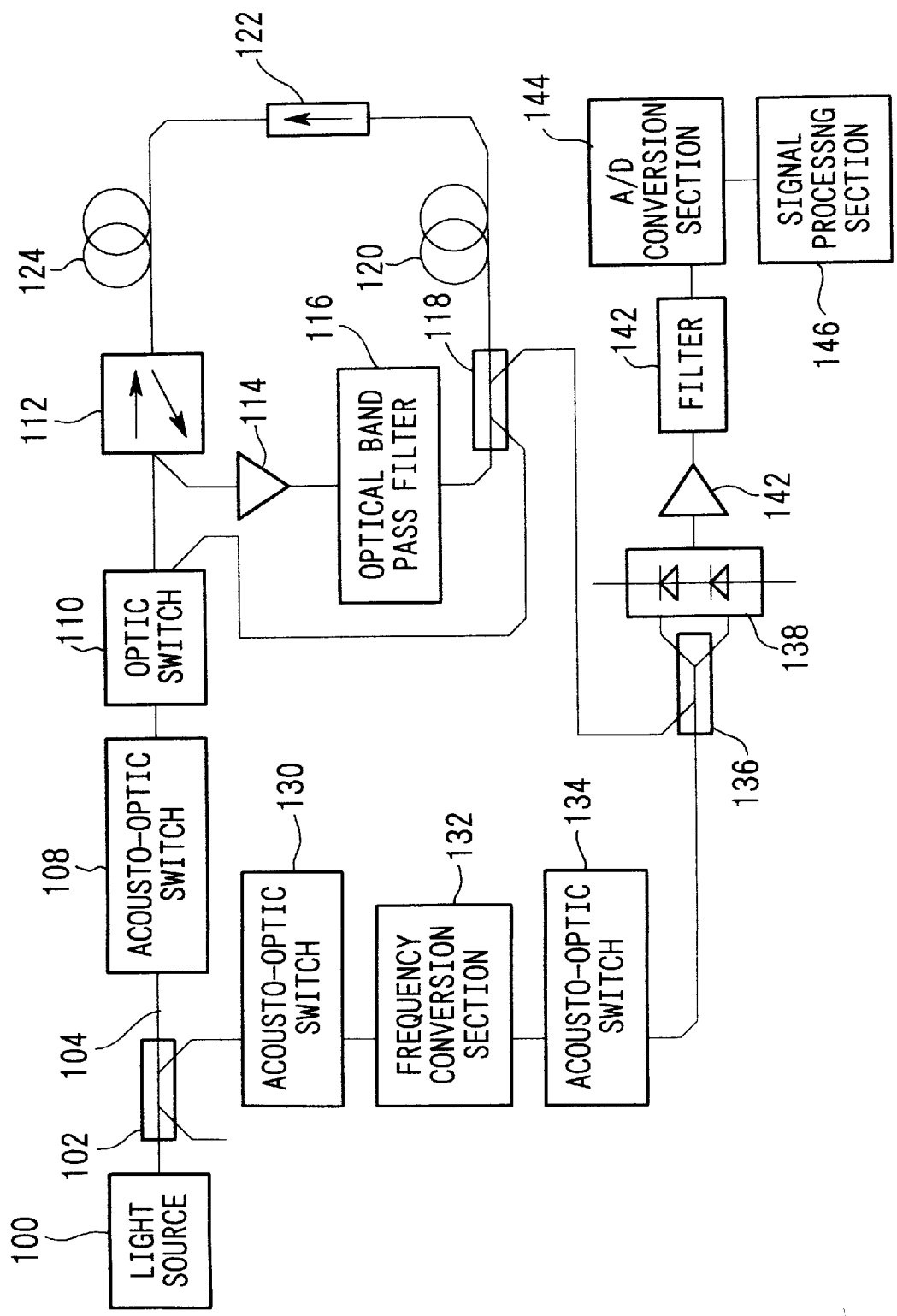
FIG. 1 is a block diagram illustrating the structure of an optical fiber strain-measuring apparatus according to an embodiment of the present invention.

First, before explaining the present invention, the prior art which is a background to the present invention will be explained.

FIG. 4 is a block diagram illustrating the structure of an optical fiber strain-measuring apparatus which is a prior art of the present invention. According to FIG. 4, 10 is a light source which emits a continuous light of a reference frequency. 14 is a optical directional coupler and is connected to the light source 10 by means of an optical fiber 12. This optical directional coupler 14 branches into two directions with a prescribed intensity the continuous light emitted from the light source 10. The first branch of the branched continuous light is called the measuring light, and is outputted to an optical fiber 16. The second branch of the branched light is called the reference light, and is outputted to an optical fiber 18.

An acousto-optic switch 20 is connected to the optical fiber 16, and pulses the measuring light inputted via the optical fiber, and outputs a measuring pulse light. This measuring pulse light is pulsed having a cycle (a time-converted value) identical to the length of a optical ring circuit mentioned below. 22 is an optical circulator, and possesses an inputting end, an outputting end, and an input-output end, and possesses a non-reversible function. In other words, light which enters the inputting end exits through the input-output end, and light which enters the input-output end exits through the outputting end. The inputting end of this optical circulator 22 is connected to the outputting end of the acousto-optic switch 20 by an optical fiber.

The optical circulator 22, an acousto-optic switch 24, an optical amplifier 26, an optical band pass filter 28, an optical directional coupler 30, a delaying optical fiber 32, an optical isolator 34, and a test optical fiber 36 are all connected in order with an optical fiber, and comprise an optical ring circuit. The measuring light outputted from the acousto-optic switch 20 is forwarded to the optical ring circuit through the optical circulator 22.

The acousto-optic switch 24 performs a switch at each prescribed time interval, and allows, from among the natural Brillouin back scattered light generated within the test optical fiber 36, only the natural Brillouin back scattered light generated at a prescribed position within the test optical fiber 36 to pass through.

The optical amplifier 26 applies an amplification to the natural Brillouin scattered light which passed through the acousto-optic switch to compensate for the light propagation loss due to the optical ring circuit. The optical band pass filter 28 eliminates the generated natural radiation and excited light, and allows only the natural Brillouin back scattered light to pass through.

The optical directional coupler 30 branches with a prescribed intensity the natural Brillouin back scattered light outputted from the optical band pass filter 28, and forwards the first branch of the branched light outside of the optical ring circuit, while forwarding the second branch of the branched light to the delaying optical fiber 32. The delaying optical fiber 32 applies only a prescribed amount of delay to the natural Brillouin back scattered light.

The optical isolator 32 forwards to the test optical fiber 36 the natural Brillouin back scattered light outputted from the delaying optical fiber 32, and does not allow the measuring pulse light outputted from the test optical fiber 36 to pass through to the delaying optical fiber 32. In other words, with respect to the optical ring circuit illustrated in the diagram, the optical isolator 34, permits light signals to travel in a counter-clockwise direction, but not in the clockwise direction. The test optical fiber 36 is the optical fiber on which the strain measurement is performed.

The optical directional coupler 14 and the optical directional coupler 40, and the optical directional coupler 30 and the optical directional coupler 40 are connected by an optical fiber 18 and an optical fiber 38, respectively, and the reference light and the natural Brillouin back scattered light are inputted into the optical directional coupler 40, and are multiplexed. 42 is a light receiving circuit, and receives and converts into electrical signals the multiplexed light outputted from the optical directional coupler 40. 44 is a electrical spectrum analyzer, and measures the amount of strain at a prescribed position within the test optical fiber 36 based on the electrical signals outputted from the light receiving circuit 42.

According to the above structure, the continuous light emitted from the light source 10 is inputted into the optical directional coupler 14 via the optical fiber 12. The continuous light inputted into the optical directional coupler 14 is branched into the measuring light and the reference light. The measuring light is pulsed by the acousto-optic switch 20, and is converted into a measuring pulse light. This measuring pulse light is inputted into the optical circulator 22, and propagates through the test optical fiber 36 of the optical ring circuit in a clockwise direction. When propagating through the test optical fiber 36, natural Brillouin back scattered light is generated. This natural Brillouin back scattered light propagates the optical ring circuit in a counter-clockwise direction, and enters the input-output end of the optical circulator 22.

Meanwhile, the measuring pulse light which propagated through the test optical fiber 36 and reaches the optical isolator 34, cannot pass through the optical isolator 34.

The natural Brillouin back scattered light which entered the optical circulator 22 is outputted from the outputting end, is inputted into the acousto-optic switch 24. Only the natural Brillouin back scattered light generated at a prescribed position within the test optical fiber 36 is extracted by this acousto-optic switch 24, and only the natural Brillouin back scattered light is outputted. The natural Brillouin back scattered light outputted from the acousto-optic switch 24 is amplified by a prescribed amount by the optical amplifier 26, and is outputted as signal light.

The signal light outputted from the optical amplifier 26 enters the optical band pass filter 28, the natural radiated light and the excited light generated at the optical amplifier 26 are eliminated, and only the natural Brillouin back scattered light is outputted. One portion of the natural Brillouin back scattered light outputted from the optical band pass filter 28 enters the test optical fiber 36 via the optical directional coupler 30, the delaying optical fiber 32, and the optical isolator 34.

In addition, the measuring pulse light which was inputted into the optical ring circuit via the optical circulator 22 and is propagating through the test optical fiber 36 in a clockwise direction, is multiplexed with the natural Brillouin back scattered light which is inputted via the optical isolator 34. Since the difference in the frequency of the multiplexed light is identical to a Brillouin frequency shift, a Brillouin amplification is generated, and the natural Brillouin back scattered light is amplified at the position where the synthesis occurs.

The above-described process is continually repeated within the optical ring circuit, and only the natural Brillouin back scattered light generated at the prescribed position within the test optical fiber 36 is amplified.

One portion of the amplified natural Brillouin back scattered light is outputted from the optical directional coupler 30, and is multiplexed by the optical directional coupler 40 with the reference light outputted from the optical directional coupler 14. The multiplexed light outputted from the optical directional coupler 40 is received by the light receiving circuit 42, and is converted into electrical signals. The electrical spectrum analyzer 44 measures the amount of strain of a prescribed position within the test optical fiber 36 based on the electrical signals outputted from the light receiving circuit 42.

However, according to the above-described optical fiber strain-measuring apparatus, since among the natural Brillouin back scattered light being outputted from the test optical fiber 36, only the natural Brillouin back scattered light corresponding to the timing of the acousto-optic switch 24 within the optical ring circuit is detected by the light receiving circuit 42, the strain only of a prescribed position within the test optical fiber 36 can be measured.

In addition, the frequency band of the synthesized light which synthesizes the reference light and the natural Brillouin back scattered light outputted from the optical ring circuit is high, ranging approximately from 10 to 12 GHz, making detection by the light receiving circuit 42 difficult.

Furthermore, since the length of the optical ring circuit, which is also the cycle of the measuring pulse light, cannot be measured, it is necessary to adjust the length of the optical ring circuit after measuring the cycle at which the measuring pulse light from the acousto-optic switch 20 is being outputted, which is extremely burdensome.

Next, an optical fiber strain-measuring apparatus according to an embodiment of the present invention will be explained with reference to diagrams.

FIG. 1 is a block diagram illustrating the structure of an optical fiber strain-measuring apparatus according to an embodiment of the present invention.

According to FIG. 1, 100 is a light source which emits a continuous light of a referential optical frequency, for example, a MQW-DFB-LD (Multi-Quantum Well Distributed Feedback Laser Diode) with an oscillating wavelength of 1.55 $\mu$m and equipping an ATC (Automatic Temperature Control). 102 is an optical directional coupler possessing one inputting end and two outputting ends. This inputting end is connected to the light source 100 by an optical fiber, and the continuous light outputted from the light source 100 is inputted here. This optical directional coupler 102 branches into two branches with a prescribed intensity the inputted continuous light. The first branch of the branched light is called the measuring light, and is outputted to an optical fiber 104. The second branch is called the reference light, and is outputted to an optical fiber 106.

An acousto-optic switch 108, complying with control signals inputted from an external control apparatus (not shown in diagram), converts the measuring light outputted from the optical directional coupler 102 into a measuring pulse light. A light switch 110 possesses one inputting end and two outputting ends. The measuring pulse light outputted from the acousto-optic switch is inputted into the inputting end, and switches the outputting end according to the control of the above-mentioned control apparatus. In other words, the light switch 110 outputs the inputted measuring pulse light to either one of the outputting ends according to the control signals of the above-mentioned control apparatus.

An optical circulator 112, an optical amplifier 114, an optical band pass filter 116, an optical directional coupler 118, a delaying optical fiber 120, an optical isolator 122, and a test optical fiber 124 comprises an optical ring circuit. The difference between this optical ring circuit and the optical ring circuit illustrated in FIG. 4 is the fact that the acousto-optic switch 24 has been omitted from FIG. 4, and the fact that one of the outputting ends of the light switch 110 is connected to the one of the inputting ends of the optical directional coupler 118.

The optical circulator 112 possesses an inputting end, an input-output end, and an outputting end. The optical circulator 112 outputs from the input-output end the measuring pulse light inputted from the input end, and outputs from the outputting end the natural Brillouin back scattered light inputted from the input-output end. The other outputting end of the light switch is connected to the inputting end of the optical circulator 112.

The optical amplifier 114 has the purpose of amplifying the inputted natural Brillouin back scattered light, and is comprised of, for example, an Er3+ doped fiber and a semi-conductor laser diode with an oscillating wavelength of 1.48 μm or the like which is an excited light source. Additionally, the optical band pass filter 116 possesses a light passing band of 5 nm which bases the wavelength of the natural Brillouin back scattered light generated within the test optical fiber 124 as the central wavelength.

118 is the optical directional coupler, possessing two inputting ends and two outputting ends. Each of the two inputting ends are connected to one of the outputting ends of the light switch 110 and the outputting end of the optical band pass filter 116, respectively, by means of optical fibers. The optical directional coupler 118 branches with a prescribed intensity one of the light signals inputted from the two inputting ends, outputs outside of the optical ring circuit the first branch of the branched lights, and outputs to the delaying optical fiber 120 the second branch of the branched lights. The delaying optical fiber 120 applies a prescribed amount of delay to the inputted multiplexed light. The length of this delaying optical fiber 120 is appropriately set based on the measuring pulse light outputted from the acousto-optic switch 108 and the like. The amount of delay relates to the amount of time taken for the light signals to propagate through the optical ring circuit. More specifically, the amount of delay has the purpose of making identical the inputting cycle of the measuring pulse light repeatedly being inputted from the optical circulator 112 and the propagation time required to propagate through the optical ring circuit once.

The optical isolator 122 forwards to the test optical fiber 124 the light signals outputted from the delaying optical fiber 120, and does not forward to the delaying optical fiber 120 the measuring pulse light outputted from the test optical fiber 124. In other words, according to the diagram, the optical isolator 122 allows the light signals to travel in a counter-clockwise direction, but does not allow the light signals to travel in a clockwise direction. The test optical fiber 124 is the optical fiber on which the strain measurement is performed.

In addition, the optical fiber 106 connected to the aforementioned optical directional coupler 102 is connected to the acousto-optic switch 130. The acousto-optic optic switch 130 pulses the reference light at prescribed cycles, and outputs the reference pulse light. 132 is a frequency conversion section which converts the optical frequency of the inputted reference pulse light. The frequency conversion section 132 is explained below with reference to FIG. 2.

Figure 2:
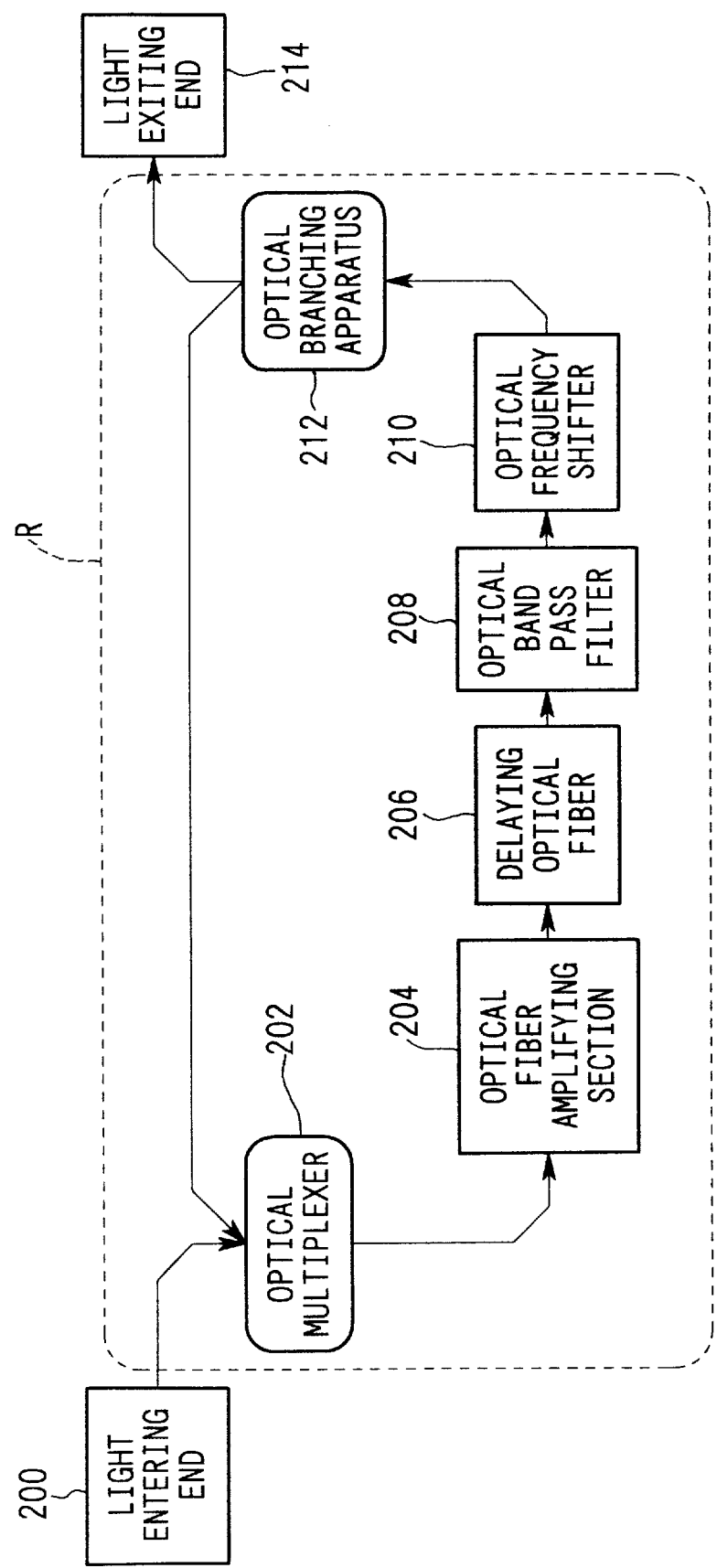
FIG. 2 is a block diagram illustrating the structure of the Frequency Conversion Section 132 indicated in FIG. 1.

FIG. 2 is a block diagram illustrating the structure of the frequency conversion section 132 indicated in FIG. 1. According to FIG. 2, 200 is the light entering end through which the reference pulse light outputted from the acousto-optic switch 130 is inputted. 202 is an optical multiplexer, possesses two inputting ends and one outputting end, and multiplexes the lights entering from the two inputting ends and outputs the multiplexed light through the outputting end. The reference pulse light inputted into the above-mentioned light entering end is guided into one of the inputting end of this optical multiplexer 202, and one of the branched light outputted from an optical branching apparatus described below is guided into the other inputting end.

204 is an optical fiber amplifying section which amplifies the multiplexed light outputted from the optical multiplexer 202. 206 is a delaying optical fiber which delays the inputted light signals by a prescribed amount of time. This delay time of the delaying optical fiber 206 is set according to the pulse width of the reference pulse light inputted into the light entering end 200. 208 is an optical band pass filter, and using a prescribed wavelength as the central wavelength, possesses, for example, a light passing band of 5 nm. The central wavelength of the optical band pass filter 208 may be set, for example, to the wavelength of the continuous light outputted from the light source 100 of FIG. 1. 210 is an optical frequency shifter, and provides a RF oscillator having an oscillating frequency of 120–122 MHz. This frequency shifter 210 shifts the frequency of the inputted light by an amount identical to the oscillating frequency of the RF oscillator, based on control signals inputted from an external source.

212 is an optical branching apparatus possessing 1 inputting end and two outputting ends, branches the light signals inputted from the inputting end to have a prescribed intensity, and outputs the light signals from the two outputting ends, respectively. The first branch of the branched light is guided to one of the inputting ends of the optical multiplexer 202. Also, the second branch of the branched light outputted from the optical branching apparatus 212 is outputted from the light outputting end 214.

As described above, the optical loop R is formed by the optical multiplexer 202, the optical fiber amplifying section 204, the delaying optical fiber 206, the optical band pass filter 208, the optical frequency shifter 210, and the optical branching apparatus 212. The loop length of this optical loop R (the loop length referred here is not a physical length, but an optical length) is set to be equal or greater than the pulse width of the reference pulse light by the delaying optical fiber 206. The branched light outputted from the frequency conversion section 132 will be referred to as a reference pulse train below.

According to FIG. 1, 134 is an acousto-optic switch, and pulses the reference pulse train outputted from the light exiting end 214 of the frequency conversion section 132, according to the control signals outputted from the aforementioned control apparatus. 136 is an optical directional coupler possessing two inputting ends and two outputting ends. Each of the inputting ends of the optical directional coupler is connected to the acousto-optic switch 134 and one of the outputting ends of the optical directional coupler 118, respectively. The light signals entering through the two inputting ends are multiplexed and branched into two branched lights. 138 is an opto-electric conversion section, which performs a heterodyne detection on the two inputted branched lights and converts it into electrical signals. 140 is an amplifier, which amplifies the inputted electrical signals. 142 is a filter, and eliminates the noise component, and allows only the signal component to pass through. 144 is an analog-digital conversion section (hereinafter, referred to as A/D conversion section) which converts the inputted analog signals into digital signals. 146 is a signal processing section, and performs such prescribed processes as an addition process, an averaging process, etc., and measures the amount of strain within the test optical fiber.

Next, the operation of an optical fiber strain-measuring apparatus according to an embodiment of the present invention will be explained.

Operation when Measuring the Strain of a Test Optical Fiber 124

FIG. 3A–3G is a diagram illustrating each part of the signals during the strain measurement by the optical fiber strain-measuring apparatus according to an embodiment of the present invention. Further, the horizontal axis of FIG. 3A–3G indicates a time axis. Also, at the time of strain measurement of the test optical fiber 124, the optical switch 110 is set to forward to the optical circulator 112 the inputted measuring pulse light.

Figure 3A:
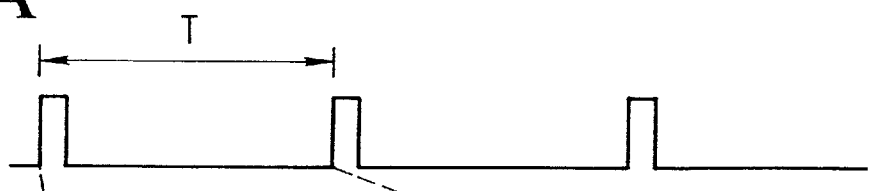
FIG. 3A is a diagram illustrating the measuring pulse light possessing a cycle T, which is the time required to travel the optical ring circuit once.
Figure 3B:
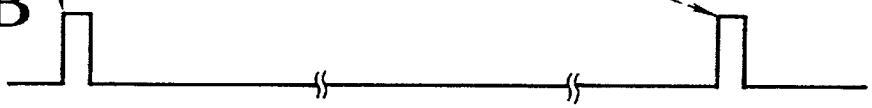
FIG. 3B is a diagram illustrating the measuring pulse light, the pulse width of which is set to a prescribed time width.

The continuous light emitted from the light source 100 is branched by the optical directional coupler 102, and the measuring light and the reference light are forwarded to the acousto-optic switches 108, 130, respectively. Let the frequency of this continuous light be $f_o$. The measuring light inputted into the acousto-optic switch 108 is pulsed, and is converted into the measuring pulse light possessing a cycle T, which is the time required to travel the optical ring circuit once (Refer to FIG. 3A, 3B. FIG. 3B is an enlarged diagram of FIG. 3A.) Further, the pulse width of the measuring pulse light is set to a prescribed time width.

The measuring pulse light outputted from the acousto-optic switch 108 is inputted into the optic switch 110. Since, when measuring, the optic switch 110 is set to output to the optical circulator 112 the inputted measuring pulse light, the measuring pulse light is forwarded to the optical circulator 112. The measuring pulse light inputted into the optical circulator 112 is outputted from the input-output end and is forwarded to the test optical fiber 124, and propagates through the test optical fiber 124. When the measuring pulse light is propagating through the test optical fiber 124, a natural Brillouin back scattered light is generated throughout the entire test optical fiber 124. This natural Brillouin back scattered light accompanies a frequency shift $f_b$ of 10–12 GHz. That is, the frequency of the natural Brillouin back scattered light is $f_o+f_b$. This natural Brillouin back scattered light is inputted into the input-output end of the optical circulator 112.

Meanwhile, the measuring pulse light, after propagating through the test optical fiber 124, cannot pass through the optical isolator 122.

The natural Brillouin back scattered light inputted into the optical circulator 112 is outputted from the outputting end thereof, and is amplified by a prescribed amount of amplification factor (an amplification factor to compensate for the propagation loss within the optical ring circuit) by the optical amplifier 114, and is outputted as signal light. The signal light outputted from the optical amplifier 114 is forwarded to the optical band pass filter 116, where the natural radiating light and the excited light generated at the optical amplifier 114 are eliminated, allowing only the natural Brillouin back scattered light to be outputted. One portion of the natural Brillouin back scattered light outputted from the optical band pass filter 116 is forwarded to the delaying optical fiber 120 via the optical directional coupler 118.

Figure 3C:
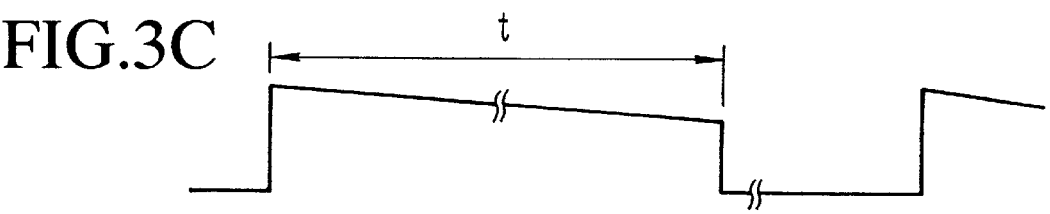
FIG. 3C is a diagram illustrating an example of a wave form of the saturated natural Brillouin back scattered light outputted from the optical directional coupler 118.

The amount of delay of the natural Brillouin back scattered light inputted into the delaying optical fiber 120 is an amount of delay to make the inputting cycle of the measuring pulse light repeatedly being inputted from the optical circulator 112 be identical to the propagation time required to propagate through the optical ring circuit once. The natural Brillouin back scattered light outputted from the delaying optical fiber 120 is inputted into the test optical fiber 124 via the optical isolator 122, and is multiplexed with the measuring pulse light outputted from the optical circulator 112. Since the difference in the frequencies of the multiplexed lights is identical to Brillouin frequency shift, a Brillouin amplification occurs, and the natural Brillouin back scattered light is amplified at the position where the multiplexing occurs. An identical operation is repeatedly performed below, and although the signal level increases each the natural Brillouin back scattered light travels around the optical ring circuit, the signal level is saturated when a certain signal level is reached. This natural Brillouin back scattered light is outputted from the optical directional coupler 118. FIG. 3C is an example of a wave form of the saturated natural Brillouin back scattered light outputted from the optical directional coupler 118.

Figure 3D:
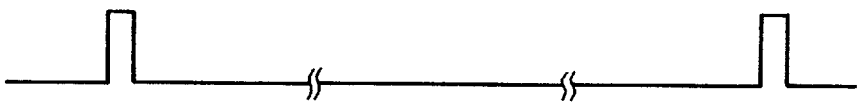
FIG. 3D is a diagram illustrating the reference light outputted from the optical directional coupler 102.
Figure 3E:
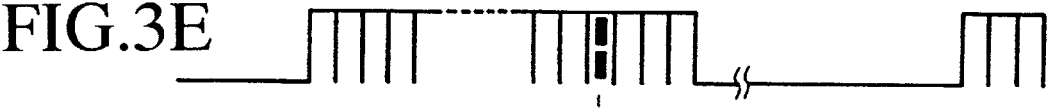
FIG. 3E is a diagram illustrating a wave form of the reference pulse train outputted from the frequency conversion section 132.

On the other hand, the reference light outputted from the optical directional coupler 102 is inputted into the acousto-optic switch 130, and is converted into the reference pulse light illustrated in FIG. 3D. The pulse width of the reference pulse light is set to, for example, 1 $\mu$sec, and the cycle thereof, when converted into units of distance, is set to be identical to the length of the optical ring circuit. This reference pulse light then enters the frequency conversion section 132. The reference pulse light which entered the frequency conversion section 132 is guided to the optical multiplexer 202 from the light entering end 200 as illustrated in FIG. 2, and then enters the optical fiber amplifying section 204. This reference pulse light receives an amplification identical to the amount lost from the optical loop R by the optical fiber amplifying section 204, receives a delay greater or equal to the pulse width of the reference pulse light by the delaying optical fiber 206, has noise and such eliminated by the optical band pass filter 208, receives a frequency shift by the amount of frequency of the RF oscillator by the optical frequency shifter 210, and is branched by the optical branching apparatus 212. One branch of the branched lights is forwarded outside through the light exiting end 214 as a portion of the reference pulse train, while the other branch of the branched lights is forwarded back into the optical loop.

In other words, when one light pulse illustrated in FIG. 3D is inputted, the frequency conversion section 132 converts the frequency of the inputted light pulse, for example, only the frequency of 120 MHz, while also delaying by an amount of time equal to the time width of the inputted light pulse, and is repeatedly being outputted. Furthermore, the wave form of the reference pulse train outputted from the frequency conversion section 132 has the wave form indicated in FIG. 3E, and is sequentially converted into a pulse train in a step-wise fashion having only a frequency of 120 MHz.

Figure 3F:
FIG. 3F is a diagram illustrating the reference pulse train which is pulsed at the inputted rate of the control signals.

The reference pulse train outputted from the frequency conversion section 132 is forwarded to the acousto-optic switch 134, and is pulsed at the inputted rate of the control signals (Refer to FIG. 3F). Let the frequency of this light pulse (hereinafter, referred to as sampling pulse) be $f_o+\Delta f$. The sampling pulse outputted from the acousto-optic switch 134 is inputted into the first inputting end of the optical directional coupler 136. Also, the natural Brillouin back scattered light forwarded from the optical directional coupler 118 is inputted through the second inputting end of the optical directional coupler 136. The sampling pulse inputted into the optical directional coupler 136 is multiplexed with the natural Brillouin back scattered light, and is branched into two branches. The two branched lights are inputted into the opto-electric conversion section 138, are heterodyne detected, and are converted into electrical signals.

Since each of the branched lights inputted into the opto-electric conversion section 138 is a multiplexed light of the sampling pulse having a frequency $f_o+\Delta f$ and of the natural Brillouin back scattered light having a frequency $f_o+f_b$, the frequency components of the multiplexed lights include the following four components: $(f_o+\Delta f) \pm (f_o+f_b)$, $f_o+\Delta f$, and $f_o+f_b$. Among these four frequency components, the frequency component of $(f_o+\Delta f)-(f_o+f_b)$, that is, the $\Delta f-f_b$ component, has the lowest frequency, and therefore detection can be performed desirably.

The electrical signal outputted from the opto-electric conversion section 138 is amplified by the amplifier 140, and the unnecessary noise component is eliminated by the filter 142 and only the signal component is forwarded to the A/D conversion section 144. The electrical signal is converted from analog signal to digital signal at the A/D conversion section 144.

The signal processing section 146 performs such prescribed processes as an averaging process, an addition process, etc. on the digital signals outputted from the A/D conversion section 144, and calculates the amount of strain.

Figure 3G:
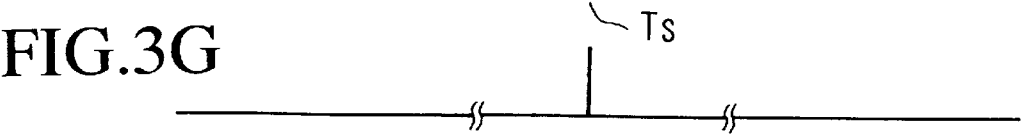
FIG. 3G is is a diagram illustrating the sampling pulse outputted from the acousto-optic switch 134.

As described above, when the frequency of the branched light entering the opto-electric conversion section 138 is $\Delta f-f_b$, detection can be desirably performed. In other words, detection can be desirably performed only at the moment when the natural Brillouin back scattered light (Refer to FIG. 3C) outputted from the optical directional coupler 113 is regulated by the sampling pulse outputted from the acousto-optic switch 134 (the moment of time labeled Ts in FIG. 3F). Therefore, the sampling pulse outputted from the acousto-optic switch 134 regulates the sampling timing as indicated in FIG. 3G, and by changing the timing at which this sampling pulse is outputted, it is possible to obtain the amount of strain at an arbitrary position within the test optical fiber 124, and to further obtain the strain distribution of the test optical fiber 124.

Operation when Measuring the Length of an Optical Ring Circuit

When measuring the length of the optical ring circuit, the optic switch 110 is set to forward the inputted measuring pulse light to the optical directional coupler 118.

The measuring pulse light outputted from the acousto-optic switch 108 is forwarded to the optic switch 110, and is then forwarded to the optical directional coupler 118. This measuring pulse light is branched into two branched lights by the optical directional coupler 118. The first branch of the branched lights is forwarded into the optical ring circuit, and the second branch of the branched lights is forwarded to the opto-electric conversion section 138 via the optical directional coupler 136. The branched light inputted into the opto-electric conversion section 138 is converted into electrical signals. This electrical signal is amplified by the amplifier 140, and has the unnecessary noise component eliminated by the filter 142, which only allows the signal component to be forwarded to the A/D conversion section 144. The electric signal is converted from analog signal to digital signal by this A/D conversion section 144, and this digital signal is inputted into the signal processing section 146.

On the other hand, the branched light inputted into the optical ring circuit travels through the delaying optical fiber 120, the optical isolator 122, the test optical fiber 124, the optical circulator 112, the optical amplifier 114, and the optical band pass filter 116, and arrives at the optical directional coupler 118. The branched light which traveled around the optical ring circuit is further branched by the optical directional coupler 118, and the first branch of the branched light is inputted into the optical ring circuit, while the second branch of the branched light is inputted into the optical directional coupler 136. The light inputted into the optical directional coupler 136 is inputted into the opto-electric conversion section 138, and is converted into electrical signals. This electrical signal, as described before, is inputted into the signal processing section 146 via the amplifier 140, the filter 142, and the A/D conversion section 144.

The digital signal based on the branched light which has not traveled around the ring circuit and the digital signal based on the branched light which has traveled around the ring circuit are inputted into the signal processing section 146. When these digital signals enter the signal processing section 146, they have a time interval equal to the time required for the branched light to travel around the optical ring circuit once. Furthermore, by obtaining this time interval, it is possible to measure the length of the optical ring circuit.

What is claimed is:

1. An optical fiber strain-measuring apparatus, comprising:

a light source, which emits continuous light of a reference frequency;

a first optical directional coupling means for branching said continuous light into a measuring light and a reference light, and for outputting the two resulting lights;

a first pulsing means for pulsing said measuring light at a prescribed cycle, and for outputting a measuring pulse light;

an optical ring circuit, comprising a test optical fiber which is the object of a strain measurement, a light circulating means for forwarding said measuring pulse light to the test optical fiber, and for forwarding the back scattered light generated within said test optical fiber, a light amplifying means for amplifying the back scattered light outputted from said light circulating means, an optical noise eliminating means for eliminating from the back scattered light amplified by said light amplifying means, the noise component generated by said light amplifying means, and for allowing only the signal component to pass through, a second optical directional coupling means for outputting after branching into two the back scattered light outputted from said optical noise eliminating means, a delaying means for applying a delay to the first branch of the back scattered light outputted from said second optical directional coupling means, and a light isolating means for outputting to said test optical fiber the back scattered light outputted from said delaying means, and for intercepting said measuring pulse light which have passed through said test optical fiber, and where the pulse outputting cycle of said pulsing means is defined by the length of the circuit;

an optical frequency converting means for outputting a reference pulse train, which periodically converts the optical frequency of said reference light, outputted from said first optical directional coupling means;

a second pulsing means for pulsing said reference pulse train at a prescribed moment, and for outputting a sampling pulse;

a third optical directional coupling means for multiplexing the second branch outputted from said second optical directional coupling means with said sampling pulse, and for outputting the multiplexed light;

a light receiving means for heterodyne receiving and converting into electrical signals said multiplexed light outputted from said third optical directional coupling means; and a signal processing means for measuring the strain of said test optical fiber based on said electrical signals outputted from said light receiving means.

2. An optical fiber strain-measuring apparatus in accordance with claim 1, wherein said signal processing means further comprises:

an amplifying means for amplifying said electrical signals;

a filter to allow only the signal component from said amplified electrical signals to pass through;

an A/D conversion section to convert said electrical signals into digital signals; and a signal processing section to perform necessary processes on said digital signals and to obtain the strain.

3. An optical fiber strain-measuring apparatus in accordance with claim 1, wherein said second pulsing means pulses said reference pulse train at an arbitrary moment of time.

4. An optical fiber strain-measuring apparatus in accordance with claim 1, wherein:

said second optical directional coupling means possesses an inputting end to guide said light signals into said optical ring circuit; and further comprising a switching means provided in between said first pulsing means and said light circulating means for forwarding to said inputting end of said second optical directional coupling means said measuring pulse light outputted from said first pulsing means; and wherein said signal processing means calculates the length of said optical ring circuit from the time difference between said electrical signals outputted from said light receiving means which are based on said measuring pulse light which are outputted from said switching means and, without traveling through said optical ring circuit, are outputted via said second directional coupling means and said third directional coupling means, and said electrical signals outputted from said light receiving means which are based on said measuring pulse light which have traveled through said optical ring circuit and are outputted via said second directional coupling means and said third directional coupling means.

5. An optical fiber strain-measuring apparatus in accordance with claim 4, wherein said switching means possesses the function to either forward to said light circulating means or to forward to said inputting end of said second optical directional coupling means said measuring pulse light outputted from said first optical directional coupling means.

* * * * *